United States Patent [19]

Stephens

[11] Patent Number: 5,787,461
[45] Date of Patent: Jul. 28, 1998

[54] HIGH SPEED OPTICAL DISK DRIVE CACHING EXECUTABLE AND NON-EXECUTABLE DATA

[75] Inventor: Mark Stephens, Burlingame, Calif.

[73] Assignee: Roadrunner Technology, Inc., San Mateo, Calif.

[21] Appl. No.: 695,405

[22] Filed: Aug. 12, 1996

[51] Int. Cl.$^6$ .................................................. G06F 13/00
[52] U.S. Cl. ............................................................. 711/113
[58] Field of Search .............................. 395/440; 711/113

[56] References Cited

U.S. PATENT DOCUMENTS

| | | | |
|---|---|---|---|
| 5,218,685 | 6/1993 | Jones | 711/160 |
| 5,261,072 | 11/1993 | Siegel | 395/842 |
| 5,390,186 | 2/1995 | Murata et al. | 395/440 |
| 5,392,413 | 2/1995 | Nomura et al. | 395/440 |
| 5,588,129 | 12/1996 | Ballard | 395/440 |
| 5,649,153 | 7/1997 | McNutt et al. | 395/440 X |

OTHER PUBLICATIONS

SmartCD by Far Stone Tech., distributed by Acer Sertek, Inc., Reviewed by Haralds Jass, Copyright Haralds for the Games Domain, 1995, http://www.gamesdomain.com/gdreview/zones/reviews/hardware/scd-rev.html.

Quarterdeck Corporation, Quarterdeck Releases Speedy-ROM, A Powerful CD-ROM Accelerator That Can Reduce CD Access Time, Marina Del Rey, CA, Mar. 25, 1996, http://www.arachnid.qdeck.com/qdeck/press/speedyrom-.html.

Circuit Specialists, Inc. Online Catalog, D-time 10, CD-ROM Accelerator Software, http://www.cir.com/pc/dtime.htm.

d-Time 10 Version 1.1 CD-ROM Accelerator Software, http://www.ballardsynergy.com/spec10.htm.

Circuit Specialists, Inc. Online Catalog, INF 168 Cacheing PCI Local-Bus to IDE HDD/CD-ROM Accelerator, http://www.cir.com/pc/inf168/inf168.htm.

*Primary Examiner*—David L. Robertson
*Attorney, Agent, or Firm*—Blakely, Sokoloff, Taylor & Zafman LLP

[57] ABSTRACT

A high speed compact disk read only memory drive. In one embodiment, a local storage device containing an optical disk drive, a fast local storage device and RAM are all coupled to controller circuitry. The controller circuitry is coupled to interface circuitry which may be coupled to the bus of an ordinary computer system. The data storage device behaves and responds similar to an ordinary CD-ROM, DVD or hard disk drive to the coupled computer system. The RAM of the disclosed data storage device is configured to store directory information and the local storage device is configured to store executable files from the optical disk drive and cache non-executable data. Non-executable data is replaced in the local storage device in accordance with a least recently used algorithm. Information requests from the coupled computer system are read directly from the RAM or the local storage device as requested with significant increases in read access time and data transfer rates.

19 Claims, 4 Drawing Sheets

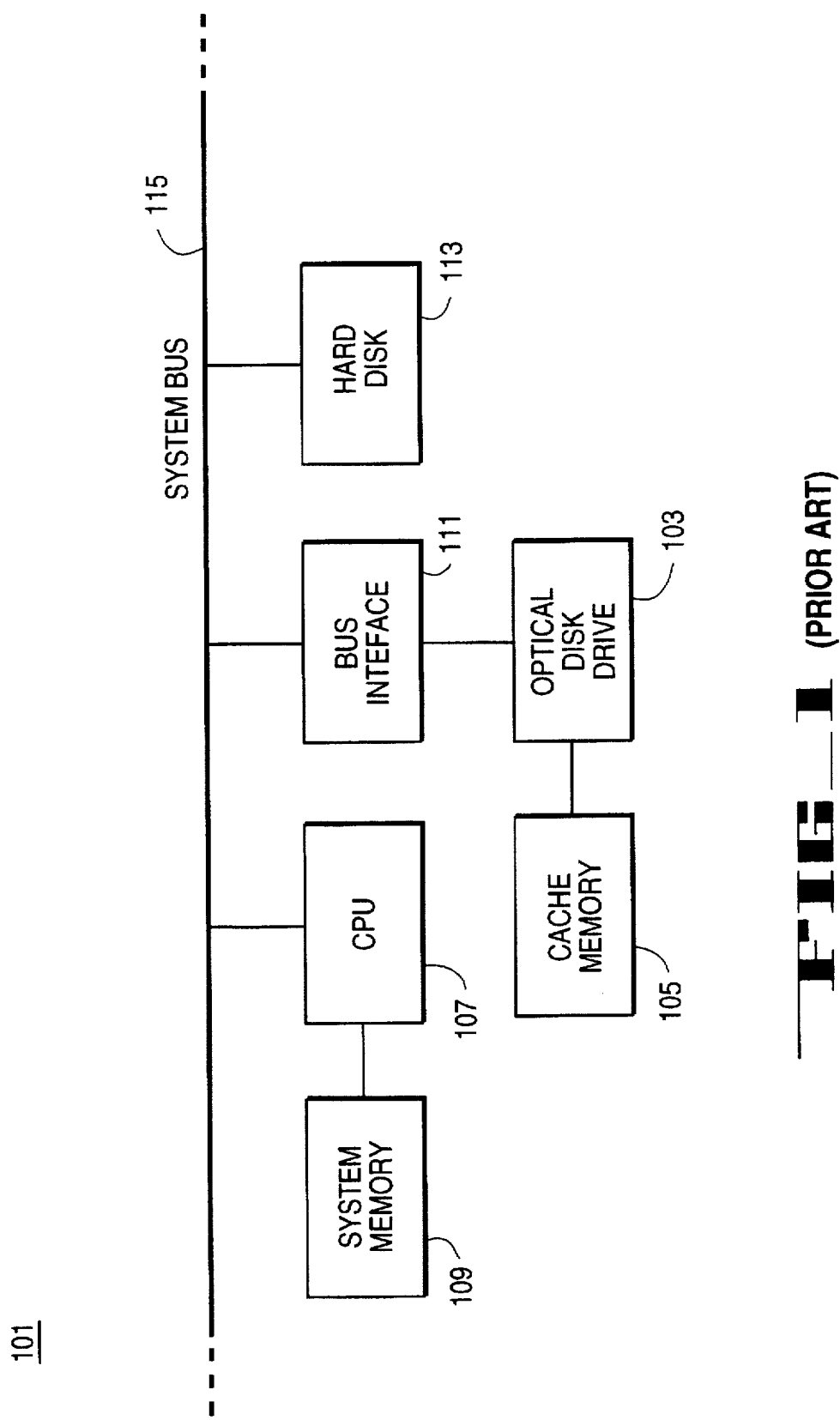
FIG_1 (PRIOR ART)

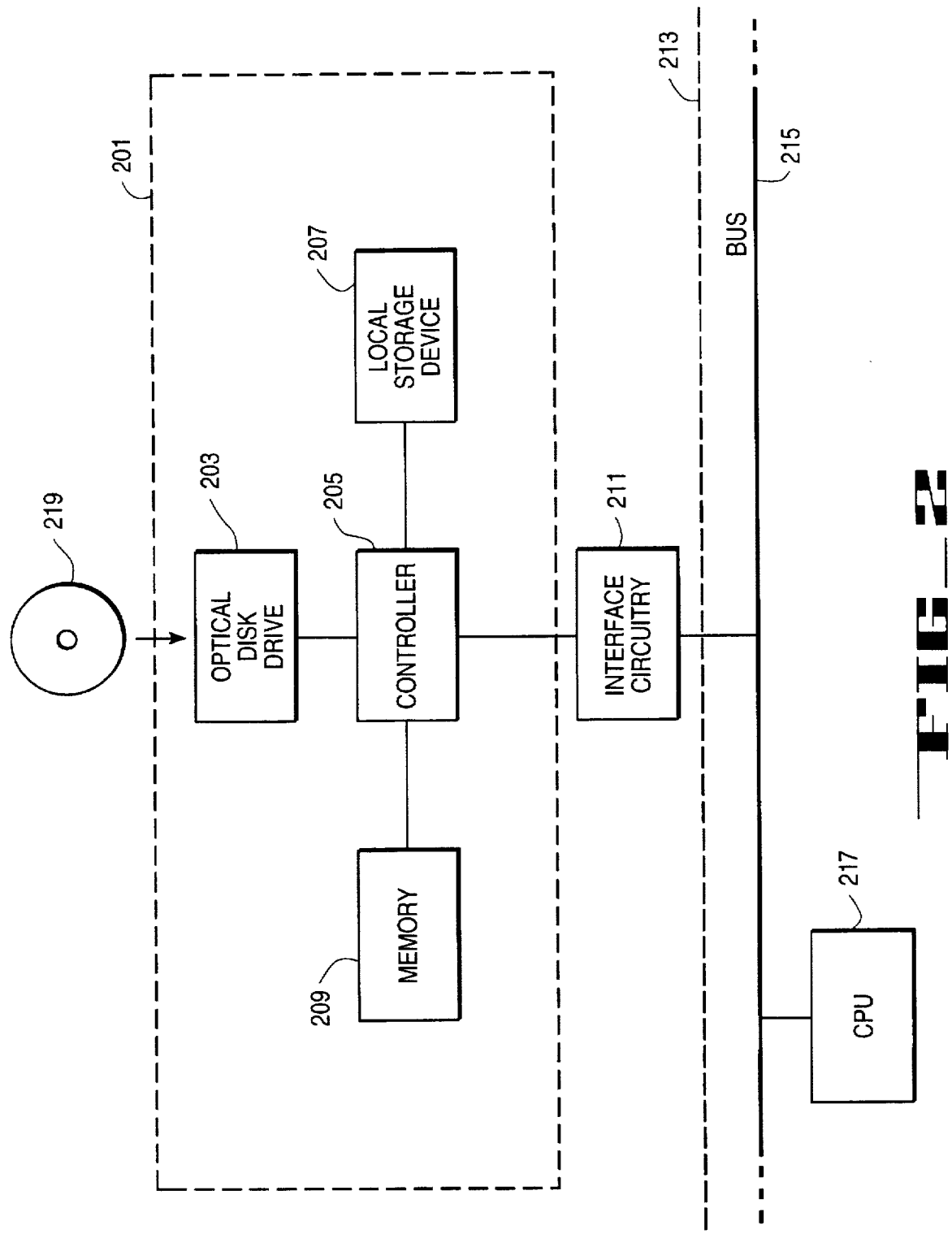

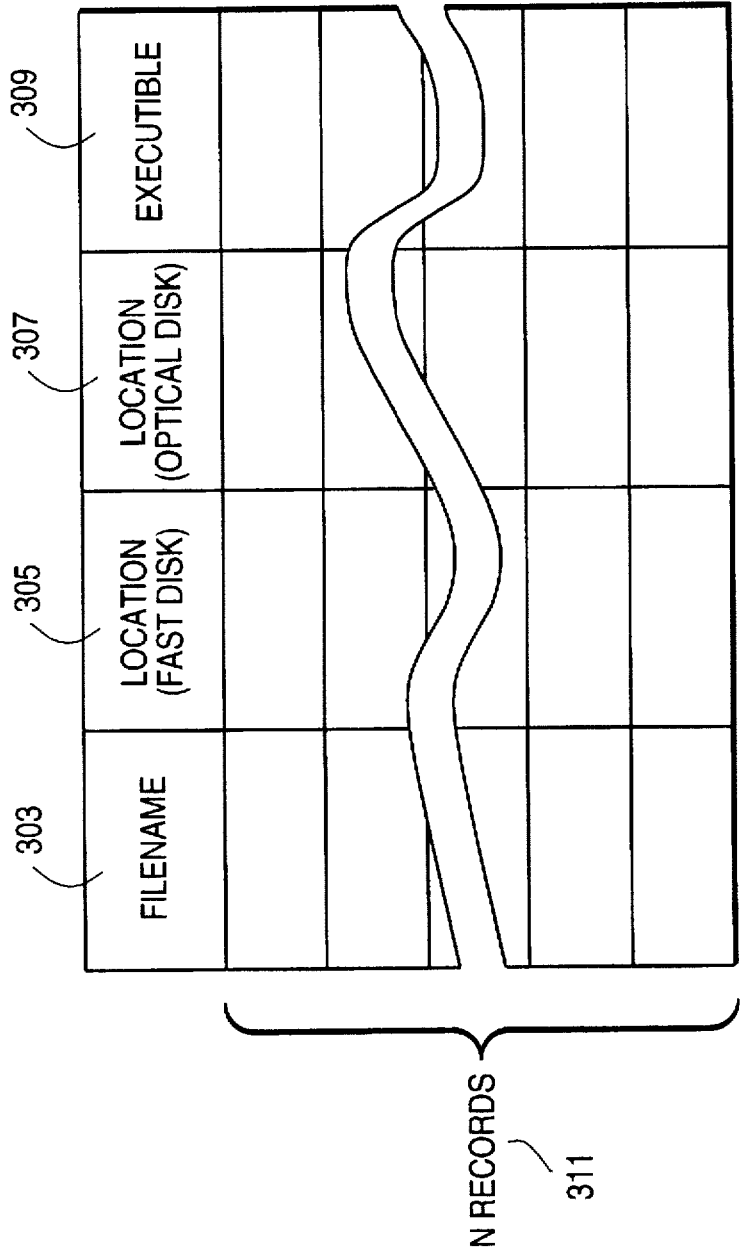

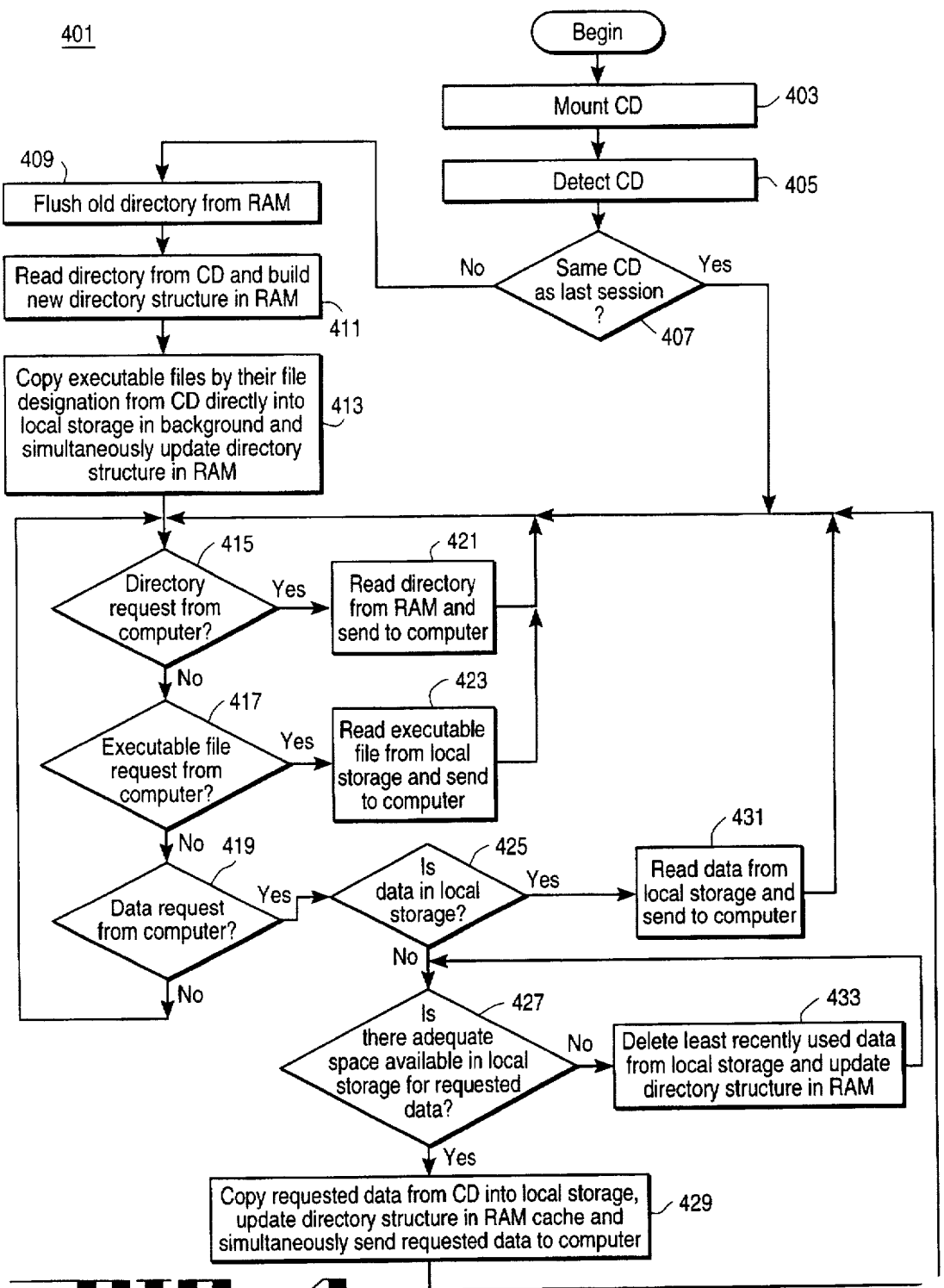
FIG_4

HIGH SPEED OPTICAL DISK DRIVE CACHING EXECUTABLE AND NON-EXECUTABLE DATA

BACKGROUND OF THE INVENTION

1. Field of the Invention

The present invention relates generally to high capacity storage devices and more specifically, the present invention relates to high capacity optical disk drives.

2. Description of the Related Art

Many of today's electronic devices utilize optical disk drives such as compact disk read only memories (CD-ROM) disk drives to store read only data. For example, in the computer and software industry, compact disks are commonly used to store and distribute computer software and data. With the continuing advances in computer software and hardware technology, compact disks are becoming increasingly ubiquitous in the computer industry as well as in other industries in which high capacity data storage is desired. Other such industries might include, but are not limited to, the music industry and the video game industry.

An advantage with CD-ROM drives is that the compact disks used to store data to be read by the CD-ROM drive may be individually removed from the CD-ROM drive and replaced with another compact disk. Thus, the user may have a collection of different compact disks which may be individually mounted and read by the CD-ROM drive as desired by the user.

One disadvantage with CD-ROM drive technology is that the access times and transfer rates associated with prior art CD-ROM drives are, in general, substantially slower than other comparable data storage technologies. For example, an ordinary double-speed CD-ROM drive commonly found in many of today's computers has an access time of about 300 milliseconds. In contrast, a comparable ordinary hard disk drive commonly found in many of today's computers has an access time of about 10 milliseconds. Furthermore, the ordinary dynamic read only memory (DRAM) found in many of today's computers has an access time of about 60 nanoseconds. Thus, the amount of time required to access and read data from a CD-ROM drive is much greater than the amount of time required to read and access other data storage technologies, all of which have been available for some time.

With the large discrepancy in speed between CD-ROM drives and other data storage technologies, there is a desire to improve the performance of CD-ROM drives to increase access time and speed. FIG. 1 shows a prior art computer system 101 utilizing a CD-ROM drive 103. CD-ROM drive 103 is coupled to the system bus 115 of computer system 101 through bus interface 111. Also coupled to system bus 115 are CPU 107 and hard disk 113. System memory 109 is coupled to CPU 107.

One prior art solution to increase CD-ROM drive speed is to include cache memory with the CD-ROM drive. This is shown in FIG. 1 as cache memory 105, which is coupled to CD-ROM drive 103. Cache memory is high speed memory which is used to store temporarily information read from CD-ROM drive 103. Prior art cache memories are typically relatively small in comparison with the storage capacity of CD-ROM drive 103. The reason for the discrepancy in size is that cache memory is generally very expensive. As a result, prior art cache memories used with CD-ROM drives usually have a storage capacity of only 128 to 256K. A problem with prior art cache memories used with CD-ROM drives is that due to their relatively small size, large amounts of information cannot be cached. Consequently, speed increases in CD-ROM drive accesses and data transfers are severely limited with prior art caches.

Other prior art methods for increasing CD-ROM drive speed have included caching information from the CD-ROM drive 103 to hard disk 113 and/or system memory 109. Typically, these prior art caching schemes involve a separate application or driver software running in CPU 107 to cache information from CD-ROM drive 103 in system memory 109 and/or hard disk 113. Consequently, CPU 107 is burdened with additional overhead to maintain the prior art caching scheme. Moreover, the execution of software in CPU 107 related to the caching of information from CD-ROM drive 103 may have conflicts with other applications running in CPU 107 and therefore unduly interrupt or interfere with other operations in computer system 101.

Therefore, what is desired is an optical disk drive such as a CD-ROM drive with increased speed which may be used in electronic systems such as, but not limited to, computer systems. Such a high speed optical disk drive could be implemented without having to cache information in other components in the existing computer system such as the system memory or the internal hard disk drive of the computer system.

SUMMARY OF THE INVENTION

A data storage device comprising an optical disk drive is disclosed. In one embodiment, the data storage device includes the optical disk drive configured to read and access optical disks. The optical disks store information such as a directory and data. Also included within the data storage device are a controller coupled to the optical disk drive with a local storage device and memory coupled to the controller. The local storage device is configured to cache data read from the optical disk drive. The memory is configured to store a second directory structure constructed from the directory read from the optical disk drive. The second directory indicates a location of data in the optical disk drive and a corresponding location of the data in the local storage device. Interface circuitry is coupled to the controller and is configured to supply data read from the optical disk drive, the memory and the local storage device to a computer interface wherein the computer interface is external to the disclosed data storage device. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

FIG. 1 is a block diagram of a prior art computer system using a optical disk drive.

FIG. 2 is a block diagram of a computer system with an optical disk drive in accordance with the teachings of the present invention.

FIG. 3 is an illustration describing the dual-level directory used in accordance with the teaching of the present invention.

FIG. 4 is a flow diagram illustrating the steps performed in accordance with the teachings of the present invention.

DETAILED DESCRIPTION

A high speed optical disk drive is disclosed. In the following description, numerous specific details are set forth such as sample memory sizes, access times, etc., in order to provide a thorough understanding of the present invention. It will be apparent, however, to one having ordinary skill in the art that the specific details need not be employed to practice the present invention. In other instances, well known materials or methods have not been described in order to avoid obscuring the present invention.

FIG. 2 shows a data storage device 201 in accordance with the teachings of the present invention. Data storage device 201 includes an optical disk drive 203 coupled to a controller 205. Also coupled to controller 205 are local storage device 207 and memory 209. Data storage device 201 is configured to provide data for other devices through interface circuitry 211 coupled to controller 205. In one embodiment of the present invention, data storage device 201 is used to provide data for a computer system 213. Accordingly, interface circuitry 211 is coupled to bus 215 which allows CPU 217 of computer 213 to access and read data from the optical disk drive 203 of local storage device 201.

It is appreciated that the local storage device 201 may be used with devices other than a computer system 213, such as video game consoles, audio or video reproduction devices, or other electronic devices without departing from the spirit and scope of the present invention.

Referring back to the embodiment shown in FIG. 2, data storage device 201 utilizes two levels of higher speed memory to effectively decrease access and read time of optical disk drive 203. In one embodiment, optical disk drive 203 is a CD-ROM drive, memory 209 is DRAM based memory and local storage device 207 is a relatively "high speed" (in comparison with a CD-ROM drive) hard disk drive, high capacity floppy disk drive, a high capacity metal foil media disk drive, or the like. When an optical disk 219 which contains a directory and associated data is initially mounted into optical drive 203, controller 205 reads the directory of optical disk 219 from optical disk drive 203 and constructs a corresponding dual-level directory structure in memory 209. Next, controller 205 copies all executable files existing on optical disk 219 from optical disk drive 203 and copies the executable files into local storage device 207. Afterwards, data requested by computer system 213 from optical disk drive 203 is cached in the remaining free storage space available in local storage device 207.

It is appreciated that with the present invention, information is provided from memory 209 or local storage device 207 to computer system 213 at substantially greater speeds than if the information were provided solely from optical disk drive 203. To elaborate, in one embodiment of the present invention, optical disk drive 203 is an ordinary double-speed CD ROM drive with an access time of 300 milliseconds. It is noted that other types of optical disk drives such as digital video disk (DVD) drives, or the like, may be used in accordance with the teachings of the present invention. Local storage device is a high speed floppy disk drive with an access time of 10 milliseconds. Memory 209 is DRAM with an access time of 60 nanoseconds. Normally, each read and access of data from the CD-ROM drive requires an initial seek to the directory in the compact disk as well as another corresponding seek to retrieve the information from the compact disk. As a result, each data access requires at least two seeks in the CD-ROM drive. It is not uncommon for a computer system to access and read a CD-ROM drive thousands of times in any particular session. With two seeks per data read access from the CD-ROM drive, the amount of time required to read data from a compact disk may be significant.

With the present invention, directory reads are provided directly from memory 209 instead of optical disk drive 203. Since memory 209 has an access time of only 60 nanoseconds in one embodiment, directory reads are virtually instantaneous in comparison to directory reads from optical disk drive 203. Thus, the amount of time required to access data from optical disk drive 203 appears to be cut in half since the time required for one of the two seeks to access data from optical disk drive 203 has been virtually eliminated with the present invention. Furthermore, if an executable file or data which has been cached in the hard drive of local storage device 207 is requested by computer system 203, the information may be accessed directly from local storage device 207 instead of optical disk drive 203. Accordingly, the time required for the second seek is also significantly reduced with the present invention since the access time of local storage device 207 is significantly less than the access time of optical disk drive 203. Moreover, it is appreciated that the data transfer rates of both memory 209 and local storage device 207 are also significantly greater than the data transfer rates of optical disk drive 203 thereby further increasing the rate of data transfer to computer system 213 through interface circuitry 211.

In one embodiment of the present invention, the components of local storage device 201 are all provided within a single framed structure or enclosure. That is, optical disk drive 203, controller 205, local storage device 207 and memory 209 are all packaged within the a same "box". Moreover, devices interfaced to the present invention exist external to the "box" of the present invention. Therefore, local storage device 201 may be installed in the same drive bay used by typical prior art CD-ROM drives in ordinary personal computers. In addition, interface circuitry 211 may be of the same type of interface circuitry used in ordinary CD-ROM drives. That is, local storage device 201 may interface with ordinary personal computers with an IDE interface, SCSI interface, or the like. In one embodiment, local storage device 201 appears and behaves to an ordinary personal computer as an ordinary IDE or SCSI prior art CD-ROM drive with the exception, of course, of being substantially faster than an ordinary prior art CD-ROM disk drive.

FIG. 3 is a diagram illustrating a dual-level directory 301 constructed in memory 209 by one embodiment of the present invention. When an optical disk 219 is initially mounted in optical disk drive 203 and it is determined whether optical disk 219 is a different optical disk than the optical disk used in a most recent session, the directory on optical disk 219 is read and dual-level directory 301 is constructed. It is noted that a particular "session" may be interpreted herein as the time between when any particular optical disk is initially mounted and read by the optical disk drive, and the time when the optical disk is removed from the optical disk drive.

As shown in FIG. 3, dual-level directory 301 is a structure which includes N records 311 with fields in each record to store information pertaining to filename 303, location on fast local storage device 305, location on optical disk 307 and an executable field 309 which indicates whether a particular file is an executable file.

As will be described in greater detail below, in one embodiment of the present invention, executable files are written and stored on the fast local storage device and not removed until another different optical disk is mounted into optical disk drive 203. Non-executable files, however, are cached in the fast local storage device 207 and removed as required to provide additional cache space in accordance with a least recently used algorithm. Executable field 309 provides controller 205 with information indicating whether a particular file is an executable file and thus, whether the particular file may be deleted from the local storage device to provide additional data cache space. Location fields 305 and 307 indicate locations of files or data in the local storage device or in the optical disk drive, respectively.

When the directory is initially read from optical disk 219, entries in location field 307 may be filled in, and location field 305 will be filled in subsequently after a particular file has been written to the fast local storage device 207. The fields in dual-level directory 301 for each particular record 311 are updated by the present invention simultaneous with the writing or removal of data from local storage device 207. In one embodiment of the present invention, memory 209 is two megabytes in size in order to provide sufficient storage space to store an entire directory from compact disk 219. It is appreciated that other memory sizes may be utilized as directory sizes on compact disks require.

FIG. 4 shows a flow diagram 401 of the steps performed by one embodiment of the present invention. In the embodiment described in flow diagram 401, the optical disk drive is a CD-ROM disk drive. Beginning with processing block 403, a compact disk is mounted into the CD-ROM drive. Afterwards, the compact disk is detected by the CD-ROM drive and it is determined whether the mounted compact disk is the same compact disk that was used in the last session, as indicated in the decision block 407. If it is determined that the compact disk which has been mounted is the same compact disk read in the previous session, then the last session is resumed. This situation will be described in greater detail below. If the compact disk which has been mounted is a different compact disk than the compact disk of the previous session, then the existing dual-level directory in RAM is flushed as indicated in processing block 409. Afterwards, the directory is read from the compact disk and a new dual-level directory structure is constructed in RAM. Next, all of the executable files as indicated by their file designation are copied from the compact disk directly into the local storage device in background while the dual-level directory structure in RAM is simultaneously updated.

It should be understood that the operations described above are performed immediately after the compact disk is initially mounted and it has been determined that the mounted compact disk is a different compact disk from the last session. In one embodiment of the present invention, each of these operations are performed in background such that the highest priority may be given to any read requests from an attached computer. That is, if an attached computer immediately requests information after a compact disk has been mounted, the controller of the present invention immediately provides the requested data from the compact disk to the requesting computer and interrupts any of the caching steps described above. As a result, the caching operations performed above by the present invention do not interfere with normal ordinary CD-ROM drive operations. Therefore, operation of the present invention is "transparent" to the computer as the presently described high speed CD-ROM drive responds just as an ordinary prior CD-ROM drive, with the exception of being much faster.

In one embodiment of the present invention, static RAM is employed to store the dual-level directory in memory such that a previous session will remain in memory even after power has been removed. As a result, the initial cache processing steps described above need not be performed to initialize caching operations for a compact disk used in a prior session before power was switched off.

After the executable files have been copied into the local storage device, the controller responds to requests from the computer and provides information accordingly. As indicated in decision block 415 if the computer requests directory information, that directory information is retrieved directly from RAM and sent to the computer. Similarly, if an executable file is requested by the computer, that executable file is retrieved directly from the local storage device and sent to the computer. With the speed advantage of the local storage device and the memory over the CD-ROM drive, significant time savings may be realized with the present invention.

Finally, if non-executable data is requested by the computer, the controller of the present invention first determines whether the requested non-executable data has been cached in the local storage device as indicated in decision block 425. If the requested data exists in the local storage device, then the data is read directly from the local storage device and sent to the computer. If, however, the requested data does not exist in the local storage device as indicated by the dual-level directory in memory, the controller then determines whether there is adequate space available in the local storage device to cache the requested non-executable data. If there is adequate space available in the local storage device for the requested data, the data is read from the compact disk drive and simultaneously sent to the computer and written to the local storage device. In addition, the dual-level directory structure is simultaneously updated as indicated in processing block 429. If, however, it is determined that there is insufficient space available in the local storage device for the requested non-executable data, then the controller deletes the least recently used data from the local storage device and simultaneously updates the dual-level directory structure in RAM accordingly as indicated in processing block 433. These steps are repeated until there is adequate space available in the local storage device for the requested data. After adequate space has been provided, the requested data is read from the compact disk and is simultaneously sent to the computer and copied into the local storage device as indicated in processing block 529.

It is noted that in one embodiment of the present invention, only non-executable data is removed from the local storage device to provide additional space for newly requested non-executable data. That is, executable files which were copied to the local storage device from the compact disk drive during initialization of the present invention remain on the local storage device for an entire session of a particular compact disk.

It is also noted that as mentioned above, a fast floppy disk drive is employed as the local storage device in one embodiment of the present invention. Consequently, the fast floppy disk drive has only approximately twenty percent of the storage capacity of an ordinary compact disk. While one embodiment of the present invention copies entire non-executable data files to the local storage device, another embodiment of the present invention copies non-executable data file fragments to the local storage device for caching purposes. The reason for this can be explained in that there may be non-executable data files on a compact disk which are bigger than the entire storage capacity of the local storage device. Thus, data file fragments, as requested by a particular application executing on a computer, are stored on the local storage device instead of the entire non-executable data file. In this particular embodiment, the dual-level directory structure in memory is updated accordingly to indicate which particular non-executable data file fragments have been cached in local storage at any particular time.

In one embodiment of the present invention, the controller is optimized to maintain the local storage device at approximately ninety to ninety-five percent capacity at any particular time. By providing an extra five to ten percent free storage space on the local storage device as overhead, the efficiency of the present invention when utilizing the local storage device is optimized. This can be explained in that the processing time required for operations performed by the controller to maintain the least recently used caching scheme is minimized since maintaining full capacity in the local storage device is not necessary.

In another embodiment of the present invention, the local storage device may have sufficient storage capacity to store an entire optical disk. In this embodiment, the same caching technique described above is still used. That is, both executable and non-executable data are read from the optical disk drive and cached in the local storage device as described above. Since the local storage device has sufficient storage capacity to store the entire contents of the optical disk, no data needs to be removed from the local storage device to cache additional information from the optical disk drive. As a result, the local storage device effectively mirrors the optical disk drive once all of the executable and non-executable data has been cached to the local storage device.

Therefore, in the foregoing detailed description, a high speed optical disk drive is described. The method and apparatus of the present invention has been described with reference to specific exemplary embodiments thereof. It will, however, be evident that various modifications and changes may be made thereto without departing from the broader spirit and scope of the present invention. The present specification and drawings are accordingly to be regarded as illustrative rather than restrictive.

What is claimed is:

1. A data storage device comprising:
    an optical disk drive configured to store information including a first directory and data, the data including executable data and non-executable data;
    a local storage device configured to cache a first data entry read from the optical disk drive;
    a memory configured to store a second directory constructed from a first directory read from the optical disk drive, wherein the second directory indicates a first location of the first data entry in the optical disk drive and a corresponding second location of the first data entry in the local storage device;
    a controller coupled to the optical disk drive, the local storage device and the memory, the controller configured to remove the first data entry from the local storage device to provide space if the first data entry is least recently used non-executable data; and
    interface circuitry coupled to the controller, the controller configured to supply the first data entry cached in the local storage device through the interface circuitry to a computer interface, wherein the computer interface is external to the data storage device.

2. The data storage device described in claim 1 wherein the second directory further indicates whether the first data entry is executable data.

3. The data storage device described in claim 1 wherein the second directory further indicates whether the first data entry is non-executable data.

4. The data storage device described in claim 3 wherein the local storage device further configured to cache a second data entry read from the optical disk drive, wherein the controller is further configured to remove the first data entry from the local storage device to provide cache space if the first data entry is non-executable data.

5. The data storage device described in claim 1 wherein the local storage device is a magnetic storage disk drive.

6. The data storage device described in claim 1 wherein the controller is further configured to provide the second directory from the memory through the interface circuitry to the computer interface.

7. The data storage device described in claim 1 wherein the data storage device is disposed within a framed structure, wherein the computer interface is external to the framed structure.

8. The data storage device described in claim 1 wherein the optical disk drive is a compact disk read only memory (CD-ROM) drive.

9. The data storage device described in claim 1 wherein the optical disk drive is a digital video disk (DVD) drive.

10. In a data storage device including an optical disk drive, a method for supplying information read from the optical disk drive, the method comprising the steps of:
    reading a first directory from the optical disk drive with a controller in the data storage device, the controller coupled to the optical disk drive;
    constructing a second directory in a memory coupled to the controller, the memory in the data storage device, the second directory indicating locations of executable files and non-executable data in the optical disk drive;
    caching the executable files from the optical disk drive in a local storage device coupled to the controller, the local storage device in the data storage device;
    updating the second directory to indicate executable file entries and corresponding locations of the executable files in the local storage device;
    caching requested non-executable data from the optical disk drive in the local storage device;
    updating the second directory to indicate corresponding locations of the requested non-executable data in the local storage device; and
    removing only non-executable data from the local storage device when additional storage space is necessary in the local storage device to cache the requested non-executable data from the optical disk drive.

11. The method described in claim 10 including the additional steps of:
    supplying directory information from the second directory through an interface coupled to the controller in response to a directory request;
    supplying the executable files from the local storage device through the interface in response to an executable file request; and
    supplying the non-executable data from the local storage device through the interface in response to a non-executable data request.

12. The method described in claim 11 wherein the interface is further coupled to a computer interface, wherein the computer interface is external to the data storage device.

13. The method described in claim 12 wherein the data storage device is disposed within a framed structure, wherein the computer interface is external to the framed structure.

14. The method described in claim 11 wherein the non-executable data includes non-executable files.

15. The method described in claim 11 wherein the optical disk drive is a compact disk read only memory (CD-ROM) drive.

16. The method described in claim 10 wherein the local storage device is a magnetic storage disk drive.

17. The method described in claim 10 including the additional steps of mounting an optical disk in the optical disk drive and determining if the optical disk is an optical disk of a most recent session, wherein the steps of mounting the optical disk and determining if the optical disk is the optical disk of the most recent session are performed before the step of reading the first directory from the optical disk drive, wherein the steps of reading the first directory, constructing the second directory, caching the executable files and updating the second directory to indicate executable file entries and corresponding locations of executable files is performed only if it is determined that the optical disk is a different optical disk from the optical disk of the most recent session.

18. The method described in claim 10 wherein the non-executable data removed from the local storage device is least recently used non-executable data.

19. The method described in claim 10 wherein in the optical disk drive is a digital video disk (DVD) drive.

* * * * *